Patented June 1, 1954

2,680,072

UNITED STATES PATENT OFFICE 2,680,072

METHOD OF FORMING PAPER

John C. Marrone, Woodbury, Conn., assignor to A. M. Meincke & Son, Inc., a corporation of Illinois No Drawing. Application September 29, 1949, Serial No. 118,721

1 Claim. (Cl. 92—21)

This invention relates to a method of forming paper and the product therefor.

Cold swelling starch of the non-gelatinized type, prepared for example as suggested in Oltman's Patent 2,105,052, has long been sold for use in paper making. Cold swelling starch of this type, however, has the disadvantage that it considerably reduces the brightness of the paper, and for this reason it has been common to add a filler with the starch to compensate, at least in part, for the loss of brightness. Such fillers, however, are expensive, and they can only be used within limits.

I have now discovered that if such cold swelling starch is prepared in an acid environment in which the starch-water mixture is adjusted to a pH of approximately 6.2 before heat treatment, as disclosed in the application of Clifford Yarber, filed September 28, 1949, Serial No. 118,480, now Patent No. 2,590,912, the resulting cold swelling starch may be employed in combination with fillers such as calcium sulfate, or any other inert fillers, without loss in brightness, and with a marked gain in brightness as compared to the same paper with the same filler and ordinary cold swelling starch.

In this connection it is preferred to employ anhydrous calcium sulfate in the ratio of 200 to 400 pounds per ton of dry pulp, or 10 to 20% of the dry pulp. With this material is employed ½ to 3% of the acidized cold swelling starch, based upon the weight of the paper pulp. The preferred amount is approximately 1%. Thus, in a 2000 pound beater, approximately 20 pounds of acidized cold swelling starch, from 200 to 400 pounds of calcium sulfate and 2000 pounds of paper would be employed.

Mixing of the material is preferably not carried out in the ordinary manner. The paper pulp and water and prepared as usual, and the pH raised to approximately 9 by the addition of rosin, the term rosin as used herein and in the paper industry meaning rosin soap such as sodium resinate. Thereafter the pH is brought down to approximately 6.2 (within the range 5.2 to 6.5) by the addition of alum or its equivalent. At this stage the filler and the acidized cold swelling starch are added, beating is continued for about fifteen minutes, and then the pH is dropped to about 4.5 to 5 by the further addition of alum or the like. Paper is then formed in the usual manner.

Raw ground gypsum may be employed instead of the anhydrous material.

Instead of heating the gypsum and the acidized cold swelling starch separately, these may be premixed, particularly if the gypsum be anhydrous. In such event, employ from ½ to 3 parts of the acidized cold swelling starch for 20 to 40 parts of anhydrous gypsum. The preferred ratio is one pound of starch to 20 to 40 pounds of the gypsum.

The preferred agent for modifying the cold swelling starch before heat treatment thereof is monosodium phosphate.

The term "acidized cold swelling starch" as used in the claims hereof means a cold swelling starch which has been acidized prior to heat treatment to within the range of 5.2 to 6.5 pH.

The foregoing detailed description is given for clearness of understanding only, and no unnecessary limitations should be understood therefrom, as modifications will be obvious to those skilled in the art.

I claim:

In the manufacture of paper, the steps which consist essentially of making a beater stock alkaline; reducing the pH of said stock to between 5.2 and 6.5 by the addition of an acid material; adding a starch filler composition consisting essentially of an acidized cold swelling starch and a gypsum filler, there being from ½ to 3% by weight of said starch based on the weight of paper pulp and from 10 to 20% by weight of said gypsum based on the weight of paper pulp and said starch being formed by adjusting the pH of a cold swelling type starch to between about 5.2 and 6.5 prior to heat treating to make the starch cold swelling; beating for a period at the reduced pH; further reducing the pH of the beater stock to approximately 4.5 to 5; and then forming paper.

References Cited in the file of this patent

UNITED STATES PATENTS

| Number | Name | Date |
|---|---|---|
| 28,182 | Jullion | May 8, 1860 |
| 219,407 | Manning | Sept. 9, 1879 |
| 848,916 | Monin | Apr. 2, 1907 |
| 1,444,956 | De Cew | Feb. 13, 1923 |
| 1,461,696 | Cassiva | July 10, 1923 |
| 1,498,269 | Harris | June 17, 1924 |
| 1,500,452 | Haggerty | July 8, 1924 |
| 1,931,928 | Rafton | Nov. 17, 1931 |
| 1,907,440 | Pattillo | May 9, 1933 |
| 2,000,031 | Larson | May 7, 1935 |
| 2,105,052 | Oltmans | Jan. 11, 1938 |
| 2,113,034 | Rowland et al. | Apr. 5, 1938 |
| 2,140,394 | Ruff | Dec. 13, 1938 |
| 2,322,930 | Gardner | June 29, 1943 |
| 2,337,459 | Edson et al. | Dec. 21, 1943 |
| 2,394,233 | Craig | Feb. 5, 1946 |
| 2,428,896 | Toulmin | Oct. 14, 1947 |
| 2,590,912 | Yarber | Apr. 1, 1952 |

OTHER REFERENCES

Kerr, "The Chemistry and Industry of Starch," (1950), pages 367 and 368.